United States Patent
Yano et al.

(10) Patent No.: US 9,285,004 B2
(45) Date of Patent: Mar. 15, 2016

(54) SILENCER FOR A MULTI-LEAF SPRING

(75) Inventors: Junichi Yano, Yokohama (JP); Naoshi Sato, Yokohama (JP); Noritoshi Sakaide, Yokohama (JP)

(73) Assignee: NHK SPRING CO., LTD., Yokohama (JP)

( * ) Notice: Subject to any disclaimer, the term of this patent is extended or adjusted under 35 U.S.C. 154(b) by 0 days.

(21) Appl. No.: 13/807,469

(22) PCT Filed: Jul. 4, 2011

(86) PCT No.: PCT/JP2011/065298
§ 371 (c)(1), (2), (4) Date: Dec. 28, 2012

(87) PCT Pub. No.: WO2012/014635
PCT Pub. Date: Feb. 2, 2012

(65) Prior Publication Data
US 2013/0099434 A1   Apr. 25, 2013

(30) Foreign Application Priority Data
Jul. 26, 2010   (JP) .................................. 2010-167340

(51) Int. Cl.
*F16F 1/20*   (2006.01)
*B60G 11/02*   (2006.01)

(52) U.S. Cl.
CPC . *F16F 1/20* (2013.01); *B60G 11/02* (2013.01); *B60G 2202/11* (2013.01)

(58) Field of Classification Search
CPC ........ F16F 1/20; B60G 11/02; B60G 2202/11
USPC ............ 267/36.1, 47, 48, 49, 50, 52, 53, 151, 267/262, 269; 428/465, 466
See application file for complete search history.

(56) References Cited

U.S. PATENT DOCUMENTS 2,014,482 A * 9/1935 Pedranti .......................... 267/52
2,346,092 A * 4/1944 Tollzien .......................... 267/49
(Continued)

FOREIGN PATENT DOCUMENTS

AU   200154098   1/2002
CN   2715964 Y * 8/2005
(Continued)

OTHER PUBLICATIONS

Legacy Polymer Products, Inc. High Density Polyethylene (HDPE) Specifications, 2009.*
(Continued)

*Primary Examiner* — Thomas J Williams
(74) *Attorney, Agent, or Firm* — Oliff PLC (57) ABSTRACT

A silencer for a leaf spring assembly. The silencer is disposed between end portions of leaf springs. The silencer has a two-layer structure which has a fixing layer and a sliding layer which are integrally formed. The fixing layer has a projection portion, and the projection portion has an engagement portion at a leading end portion thereof. The fixing layer, which is fixed at the fixing side leaf spring, has a tensile strength higher than the sliding layer. The sliding layer, which abuts the sliding side leaf spring, has a hardness lower than the fixing layer. The projection portion of the fixing layer can have sufficient strength to resist the shearing force. In the sliding layer, undesirable noise generation is difficult, and even when a load transmission portion of an end portion of the sliding side leaf spring partially abuts the sliding layer, undesirable noise generation can be prevented.

9 Claims, 5 Drawing Sheets

(56) References Cited

U.S. PATENT DOCUMENTS

| | | | | |
|---|---|---|---|---|
| 2,663,563 A | * | 12/1953 | Watson | 267/49 |
| 2,708,111 A | * | 5/1955 | Sturtevant | 267/49 |
| 3,195,876 A | * | 7/1965 | Tea | 267/52 |
| 4,022,449 A | * | 5/1977 | Estorff | 267/48 |
| 5,939,179 A | * | 8/1999 | Yano et al. | 428/465 |

FOREIGN PATENT DOCUMENTS

| | | |
|---|---|---|
| CN | 1799151 A | 7/2006 |
| DE | 1208559 B | 1/1966 |
| EP | 0734853 B1 | 2/2000 |
| FR | 2526110 A2 | 11/1983 |
| JP | A-03-219128 | 9/1991 |
| JP | A-06-002724 | 1/1994 |
| JP | U-06-65634 | 9/1994 |
| JP | A-2000-193000 | 7/2000 |
| JP | A-2004-306458 | 11/2004 |
| JP | A-2007-247754 | 9/2007 |
| JP | A-2009-185887 | 8/2009 |
| WO | WO 2004/099646 | 11/2004 |

OTHER PUBLICATIONS

WS Hampshire, Inc. Typical Properties of PTFE.*
Granta Design, Ltd. Yield Stress and Tensile Strength.*
Sep. 20, 2011 International Search Report issued in International Patent Application No. PCT/JP2011/065298 (with translation).
Chinese Office Action dated Jun. 4, 2014 issued in Chinese Patent Application No. 201180036536.3 (with translation).
Mar. 25, 2015 Supplementary Extended Search Report issued in European Patent Application No. 11 81 2228.2.

* cited by examiner

SILENCER FOR A MULTI-LEAF SPRING

TECHNICAL FIELD

The present invention relates to a silencer for a leaf spring assembly. In particular, the present invention relates to an improvement in a superior technique for various characteristics.

BACKGROUND ART

In a leaf spring assembly used in a suspension for vehicles (cars or the like), plural leaf springs are laminated, and a U-shaped bolt, which holds the leaf springs, is mounted from an upper side of a longitudinal direction central portion to the leaf springs. In this case, for example, a spacer is provided between the leaf springs at the longitudinal direction central portion, and for example, a pad is provided between the uppermost leaf spring and the U-shaped bolt. In the leaf spring assembly, both end portions of the U-shaped bolt are fastened to an axle disposed at a lower side of the lowermost leaf spring.

In this leaf spring assembly, a silencer is provided between the leaf springs at both longitudinal direction end portions thereof. The silencer is used to prevent generation of undesirable noises by sliding of the leaf springs. In the silencer, a projection portion is formed at one surface facing the leaf springs, and the projection portion is fixed at a hole of the leaf spring. Thus, the silencer is fixed at the leaf spring (fixing side leaf spring).

In this silencer, the following characteristics are required. That is, since the projection portion receives shearing force from the fixing side leaf spring, it is necessary that the projection portion have sufficient strength. Since another surface (surface opposite to the one surface having the projection portion formed thereat) of the silencer slides on the leaf spring (sliding side leaf spring), at the another surface of the silencer, wear resistance is required, and prevention of undesirable noises generated by sliding on the leaf spring is required.

In consideration of these circumstances, in order to improve strength of projection portion, a technique has been proposed in which a reinforcing hardware is provided inside a silencer made of a rubber compact (see Patent Document 1, for example). On the other hand, in order to prevent undesirable noise generation, a technique has been proposed in which two silencers, which are made of the same material, are laminated between leaf springs and slide on each other (see Patent Document 2, for example).

Patent Document 1 is Japanese Unexamined Patent Application Publication No. 2007-247754. Patent Document 2 is Japanese Unexamined Utility Model (Registration) Application Publication No. H6-65634.

DISCLOSURE OF THE INVENTION

Problems Solved by the Invention

However, in the technique of Patent Document 1, it is necessary that the reinforcing hardware, which is another part, be provided inside the silencer, and the production process for silencers is complicated. In the technique of Patent Document 2, since the two silencers are provided between the leaf springs, the number of parts is greater. In order to realize improvement in both strength of projection portion and prevention of undesirable noise generation, the above problems occur.

An object of the present invention is to provide a silencer for a leaf spring assembly, which can realize both improvement in strength of projection portion and prevention of undesirable noise generation, and which allows production for silencers to be easier and which can reduce the number of parts of the silencer by simplification of structure of the silencer.

Means for Solving the Problems

The inventors have studied a structure of silencer for leaf spring assembly. As a result, the inventors have found that a multilayer structure is used in which layers, which are proximate to each other, use different materials or the same material and are different from each other in hardness, so that the production for silencers can be easier, and the number of parts of the silencer can be reduced by simplification of structure of silencer.

In this case, regarding the material of silencer for leaf spring assembly, when a material having a lower tensile strength is used, strength against shearing force may be insufficient. However, when a material having a higher tensile strength is used, strength against shearing force may be sufficient, so that breakage can be prevented. When a material having a higher hardness is used, the hardness is higher, so that undesirable noises may easily generate. In particular, when partial contact occurs at load transmission portion of end portion of leaf spring, risk of undesirable noise generation may be higher. However, when a material having a lower hardness is used, undesirable noise generation may be difficult. Thus, even when partial contact occurs at load transmission portion of end portion of leaf spring, undesirable noise generation can be inhibited.

In a multilayer structure proposed by the inventors, in consideration of characteristics of material, one outermost layer of the multilayer structure, which has a projection portion formed thereat, has a higher tensile strength, and another outermost layer of the multilayer structure, which slides on a leaf spring, has a lower hardness, so that both improvement in strength of projection portion and prevention of undesirable noise generation can be realized, and the present invention has been made.

According to one aspect of the present invention, a silencer for a leaf spring assembly, includes: a multilayer structure in which layers proximate to each other are integrally formed; and a projection portion which is formed at one outermost layer of the multilayer structure, wherein the one outermost layer has a tensile strength higher than another outermost layer of the multilayer structure, and the another outermost layer has a hardness lower than the one outermost layer.

In the above aspect of the present invention, the silencer has the multilayer structure having the outermost layers of which the tensile strength and the hardness are set as described above. Thus, when the silencer is disposed between leaf springs of leaf spring assembly, the one outermost layer is fixed by the projection portion at a fixing side leaf spring, and the another outermost layer is disposed at a side of a sliding side leaf spring. Thus, both breakage prevention by improvement in strength of the projection portion and prevention of undesirable noise generation can be realized. These effects can be obtained without using a reinforcing hardware and preparing plural silencers. The multilayer structure can be obtained by integral formation of the layers proximate to each other, so that it is not necessary to use an adhesive. As a result, production for silencers can be easier, and the number of parts of the silencer can be reduced by simplification of structure of silencer.

The silencer for leaf spring assembly can use various structures. For example, according to a desirable embodiment of the present invention, a layer, which has a compressive elastic modulus higher than the outermost layers, may be provided between the outermost layers. In a leaf spring assembly, at an end portion of a leaf spring at which the silencer is disposed, curvature radii of leaf springs next to each other may be different from each other, so that an interval between the leaf springs in a longitudinal direction of the leaf spring assembly may be different (for example, the interval between the leaf springs may be larger toward the longitudinal direction outside of the leaf spring assembly). In this embodiment, since the layer, which has a compressive elastic modulus higher than the outermost layers, can be elastically deformed depending on pressing force from the sliding side leaf spring, the overall of another outermost layer can contact the sliding side leaf spring. As a result, partial contact can be prevented.

According to another desirable embodiment of the present invention, the one outermost layer may be more wear-resistant than the another outermost layer. When rubber is used as a material of the another outermost layer abutting the sliding side leaf spring, wear by sliding may occur. In contrast, even if the silencer may be used beyond warranty running distance and the another outermost layer may be worn out, since the one outermost layer, which is more wear-resistant than the another outermost layer, may exist, the function of the silencer can be maintained.

According to another desirable embodiment of the present invention, the multilayer structure may have an outline shape which is a square shape. In this embodiment, contact area between the silencer and the leaf spring can be greater, so that the surface pressure on the leaf spring can be lower. As a result, wear, which may be caused by sliding on the leaf spring, can be inhibited. According to another desirable embodiment of the present invention, the another outermost layer may have a surface which is tapered. In this embodiment, the surface of the another outermost layer can be disposed in accordance with broadening manner of the interval between the leaf springs. For example, when the interval between the leaf springs is larger toward the longitudinal direction outside of the leaf spring assembly, thicker side portion of the another outermost layer may be positioned at the longitudinal direction outside of the leaf spring assembly, so that partial contact can be prevented.

Effects of the Invention

According to the silencer for a leaf spring assembly of the present invention, both improvement in strength of projection portion and prevention of undesirable noise generation can be realized, and production for silencers can be easier, and the number of parts of the silencer can be reduced by simplification of structure of silencer.

BRIEF DESCRIPTION OF DRAWINGS

FIGS. 2A to 2C show a structure of the silencer for a leaf spring assembly shown in FIG. 1.

FIGS. 3A and 3B show a modification example of a silencer for a leaf spring assembly of one embodiment according to the present invention. FIGS. 4A and 4B show another modification example of a silencer for a leaf spring assembly of one embodiment according to the present invention.

EXPLANATION OF REFERENCE NUMERALS

Reference numerals 1A to 1C denote a silencer, reference numeral 11 denotes a fixing layer (one outermost layer), reference numeral 12 denotes a projection portion, reference numeral 13 denotes an engagement portion, reference numeral 13A denotes a notch portion, reference numeral 13B denotes a flange portion, reference numeral 21 denotes a sliding layer (another outermost layer), reference numeral 100 denotes a leaf spring assembly, reference numeral 101 denotes a fixing side leaf spring, and reference numeral 102 denotes a sliding side leaf spring.

EMBODIMENTS OF THE INVENTION

Figure 1:
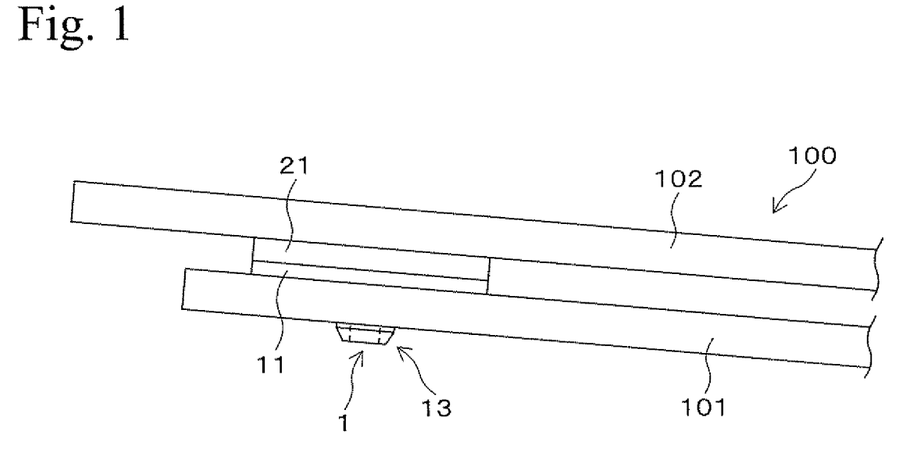
FIG. 1 is a side view which shows a schematic structure of a silencer for a leaf spring assembly of one embodiment according to the present invention and which shows a condition in which the silencer is disposed between leaf springs of a leaf spring assembly.
Figure 2A:
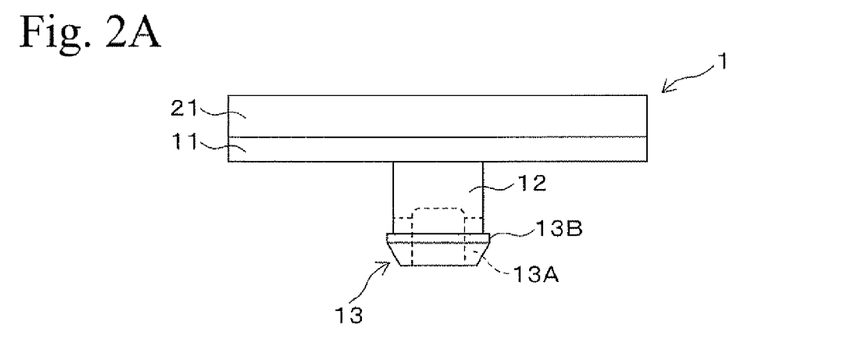
FIG. 2A is a side view of the silencer.
Figure 2B:
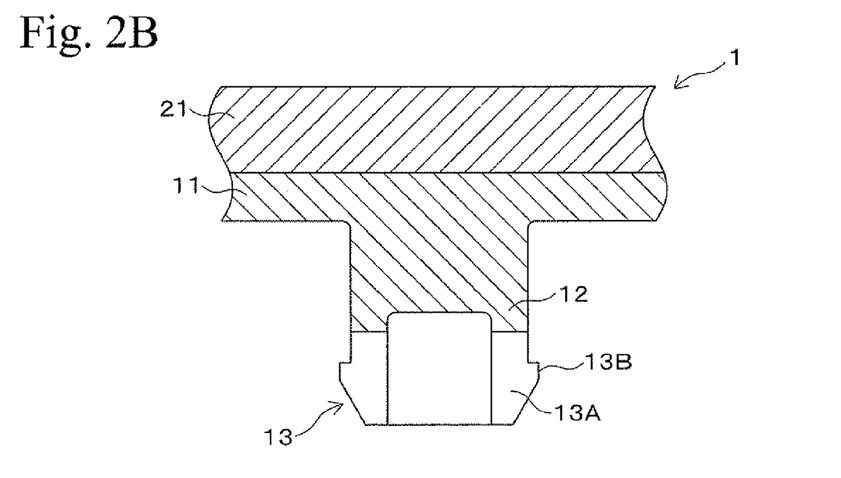
FIG. 2B is an enlarged side cross-sectional view of the silencer.
Figure 2C:
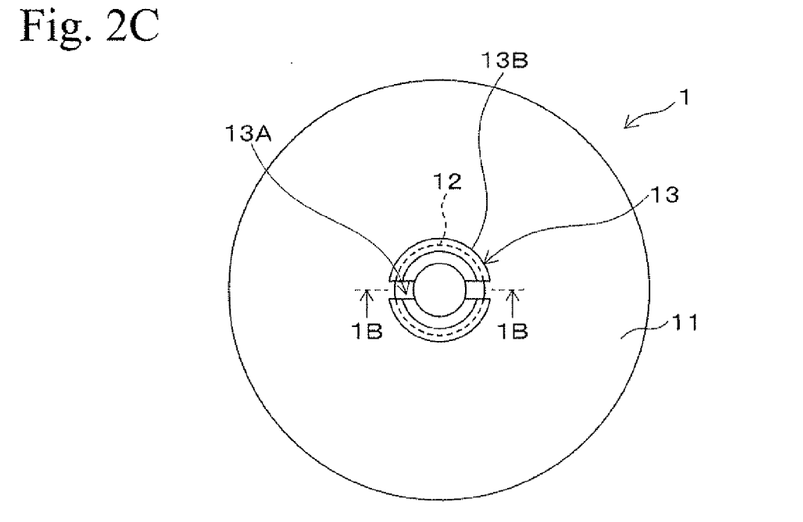
FIG. 2C is a plane view of the silencer.

One embodiment of the present invention will be explained hereinafter with reference to the Figures. FIG. 1 is a side view which shows a schematic structure of a silencer 1 for a leaf spring assembly (hereinafter referred to as "silencer 1") of one embodiment according to the present invention and which shows a condition in which the silencer 1 is disposed between leaf springs 101 and 102 of a leaf spring assembly 100. FIGS. 2A to 2C show a structure of the silencer 1 for a leaf spring assembly shown in FIG. 1. FIG. 2A is a side view of the silencer 1, FIG. 2B is an enlarged side cross-sectional view of the silencer 1, and FIG. 2C is a plane view of the silencer 1. FIG. 2B is a side cross-sectional view taken along the line 1B-1B in FIG. 2C. The leaf spring assembly 100 is a typical leaf spring assembly, and in FIG. 1, only a left end portion of the leaf spring assembly 100 is shown. The silencer 1 is disposed between end portions of the leaf springs 101 and 102. FIG. 2C is a plane view of the silencer 1 seen from a projection portion 12 side of the silencer 1.

For example, the silencer 1 has a two-layer structure which has a fixing layer 11 (one outermost layer) and a sliding layer 21 (another outermost layer). The fixing layer 11 and the sliding layer 21 are different from each other in material. The fixing layer 11 has a projection portion 12, and the projection portion 12 has an engagement portion 13 at a leading end portion thereof. The fixing layer 11 and the sliding layer 21 are integrally formed. For example, the projection portion 12 has an approximately columnar shape, and for example, the engagement portion 13 has an approximately cylindrical shape.

A pair of notch portions 13A is formed at the engagement portion 13. The engagement portion 13 has a peripheral surface having a tapered shape of which a diameter is larger toward the sliding layer 21 side. A flange portion 13B is formed at an end portion of the engagement portion 13 which is proximate to the sliding layer 21. The flange portion 13B has a diameter which is set to be larger than that of a hole portion of the fixing side leaf spring 101 into which the projection portion 12 is inserted. The engagement portion 13 has a tapered shape and can be deformed toward the inside by the notch portions 13A, so that the projection portion 12 can be easily inserted into the hole portion of the fixing side leaf spring 101. After the engagement portion 13 passes through the hole portion of the fixing side leaf spring 101, the engagement portion 13 returns to an initial shape, and the flange portion 13B, which has a diameter larger than that of the hole portion, engages with the surface of the fixing side leaf spring 101. Thus, the fixing layer 11 is fixed at the fixing side leaf spring 101, and the sliding layer 21 is disposed at the sliding side leaf spring 102.

The fixing layer 11, which is fixed at the fixing side leaf spring 101, has a tensile strength higher than that of the sliding layer 21. The sliding layer 21, which abuts the sliding side leaf spring 102, has a hardness lower than that of the fixing layer 11. Thus, the projection portion 12 of the fixing layer 11 can have sufficient strength to resist the shearing force. In the sliding layer 21, it is difficult for undesirable noise to be generated, and even when a load transmission portion of an end portion of the sliding side leaf spring 102 partially abuts to the sliding layer 21, undesirable noise generation can be prevented.

For example, thermoplastic polyether system elastomer and polyacetal system resin can be used as a material of the fixing layer 11 satisfying the above characteristics. For example, the thermoplastic polyether system elastomer has a hardness (Shore D hardness) of 64D, a tensile strength of 55 MPa, a tensile elongation modulus of 350%, and abrasion loss of 70 mg (abrasion wheel H22). For example, the polyacetal system resin has a hardness (HRM hardness) of 80HRM, a tensile strength of 66 MPa, a tensile elongation modulus of 60%, and abrasion loss of 14 mg (D1044). For example, thermoplastic polyester system elastomer and thermoplastic polyolefin system elastomer can be used as a material of the sliding layer 21. For example, the thermoplastic polyester system elastomer has a hardness (Shore A hardness) of 80A, a tensile strength of 45 MPa, a tensile elongation modulus of 600%, and abrasion loss of 15 mg (abrasion wheel H22). For example, the thermoplastic polyolefin system elastomer has a hardness (Shore A hardness) of 70A, a tensile strength of 6 MPa, and a tensile elongation modulus of 700%.

Thickness of the fixing layer 11 is not limited, and it is desirable that the fixing layer 11 have a thickness of 2 mm or more. When the leaf spring assembly 100 is used, the sliding layer 21 may slide on the sliding side leaf spring 102 and may be worn. Therefore, thickness of the sliding layer 21 is desirably thicker than that of the fixing layer 11. In this case, it is desirable that the thickness of the sliding layer 21 be set as thick as possible.

It is desirable that the fixing layer 11 be more wear-resistant than the sliding layer 21. Even if the silencer 1 may be used beyond warranty running distance and the sliding layer 21 may be worn out, since the fixing layer 11 exists, the function of the silencer can be maintained.

Figure 6:
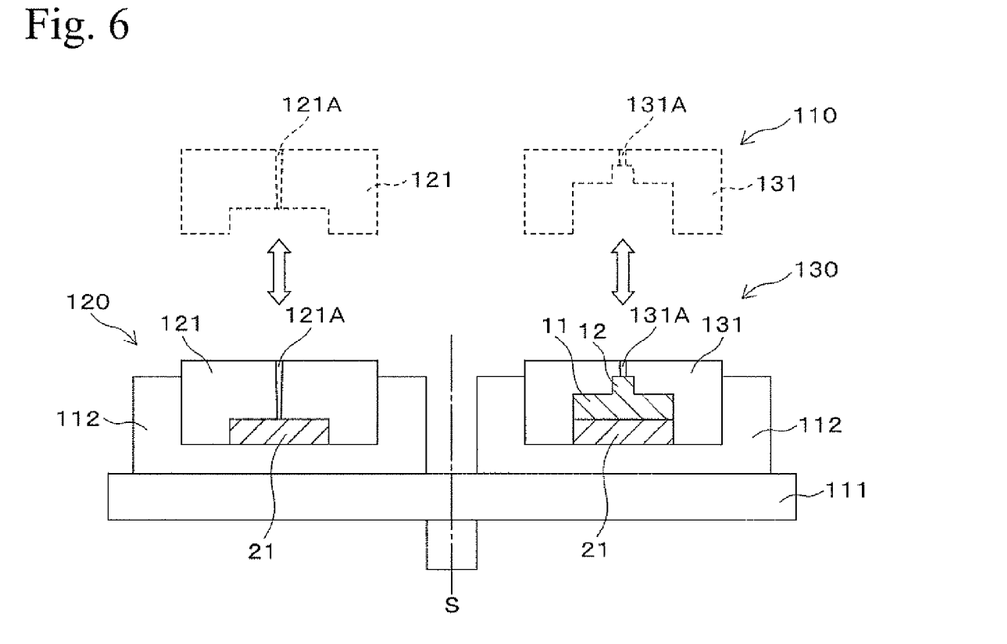
FIG. 6 is a schematic side cross-sectional view which shows a portion of a structure of one example of a molding machine used in two-color molding for a silencer for a leaf spring assembly of one embodiment according to the present invention.

For example, the silencer 1 can be produced by a two-color molding. FIG. 6 is a schematic side cross-sectional view which shows a portion of a structure of one example of molding machine 110 used in two-color molding. The molding machine 110 is equipped with a first molding die 120 and a second molding die 130. The first molding die 120 is a die for forming the sliding layer 21, and has an upper die 121 and a lower die 112. The second molding die 130 is a die for forming the fixing layer 11 having the projection portion 12, and has an upper die 131 and a lower die 112.

The upper die 121 is mounted to a first molding injection apparatus (not shown in the Figures) and has an injection opening 121A. The injection opening 121A is an opening for injecting a material of a sliding layer, which is supplied from the first molding injection apparatus, into a cavity. The upper die 131 is mounted to a second molding injection apparatus (not shown in the Figures) and has an injection opening 131A. The injection opening 131A is an opening for injecting a material of a fixing layer, which is supplied from the second molding injection apparatus, into a cavity. The upper dies 121 and 131 can move in a vertical direction (arrow direction in FIG. 6)

The lower dies 112 and 112 are fixed on a rotary table 111 which can rotate around a rotational axis S. The lower dies 112 and 112 are shared dies which are alternately used by rotation of the rotary table 111 in the first molding die 120 and the second molding die 130. As shown in FIG. 6, a shape corresponding to the silencer 1 (in particular, a shape of a portion corresponding to the engagement portion 13 of the projection portion 12) is simplified. The solid line in FIG. 6 shows a condition of closed dies, and the broken line in FIG. 6 shows the upper dies 121 and 131 in an opened condition.

In two-color molding, first, the first molding die 120 and the second molding die 130 are closed, and cavities are formed. Next, in the first molding die 120, a material of a sliding layer is injected from the material injection opening 121A into the cavity, and the material is cured, so that a sliding layer 21 is formed. Next, the first molding die 120 and the second molding die 130 are opened, the rotary table 111 is rotated around the rotational axis S, and the lower die 112 having the sliding layer 21 formed therein is positioned at the second molding die 130, and the empty lower die 112 is positioned at the first molding die 120.

Next, the first molding die 120 and the second molding die 130 are closed, and cavities are formed. Next, in the second molding die 130, a material of a fixing layer is injected from the material injection opening 131A into the cavity, and the material is cured, so that a fixing layer 11 having a projection portion 12 is formed. Thus, in the second molding die 130, a silencer 1 is obtained. The silencer 1 has the projection portion 12 having an engagement portion 13, the fixing layer 11, and the sliding layer 21, which are integrally formed. On the other hand, in the first molding die 120, at the same time as the above injection, a material of a sliding layer is also injected from the material injection opening 121A into the cavity, and the material is cured, so that a sliding layer 21 is formed. Next, the first molding die 120 and the second molding die 130 are opened, and the silencer 1 is ejected from the second molding die 130.

Next, the rotary table 111 is rotated around the rotational axis S, the lower die 112 having the sliding layer 21 formed therein is positioned at the second molding die 130, and the empty lower die 112 is positioned at the first molding die 120. After that, the same processes described above are repeated, so that silencers 1 are obtained in sequence.

In this embodiment, when the silencer 1 is disposed between the leaf springs 101 and 102 of the leaf spring assembly 100, the fixing layer 11 having a high tensile strength is fixed by the projection portion 12 at the fixing side leaf spring 101, and the sliding layer 21 having a low hardness is disposed at the side of the sliding side leaf spring 102. Thus, both breakage prevention by improvement in strength of the projection portion 12 and prevention of undesirable noise generation can be realized. These effects can be obtained without using a reinforcing hardware and preparing plural silencers. The two-layer structure can be obtained by integral formation of the fixing layer 11 and the sliding layer 21, so that it is not necessary to use an adhesive. As a result, the production for silencers can be easier, and the number of parts of the silencer can be reduced by simplification of structure of silencer.

Although the present invention is explained by using the above embodiment, the present invention is not limited to the above embodiment, and various modifications can be made. For example, in the above embodiment, the two-layer structure is used as a multilayer structure. Alternatively, a multilayer structure having three or more layers may be used by using different materials as necessary. In this case, multicolor molding is desirably performed.

Figure 3A:
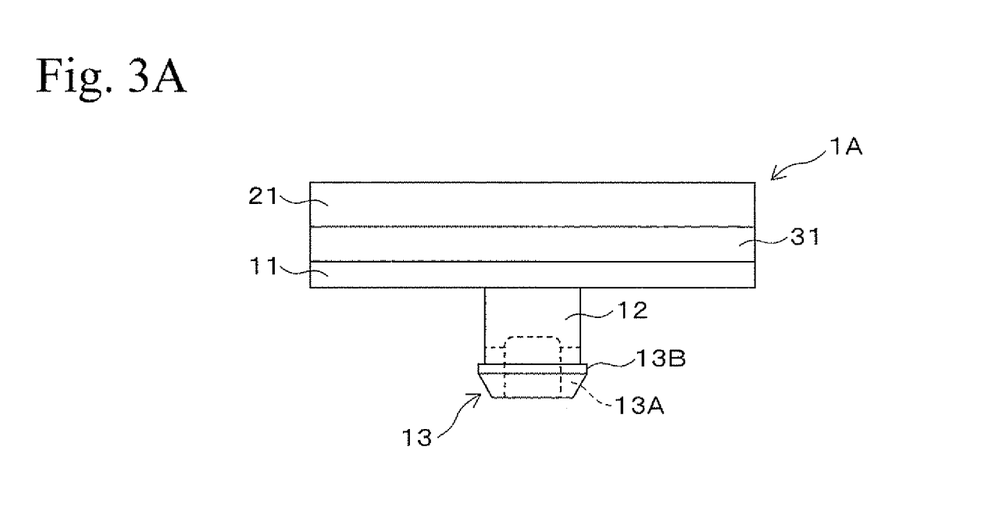
FIG. 3A is a side view of the modification example of the silencer.
Figure 3B:
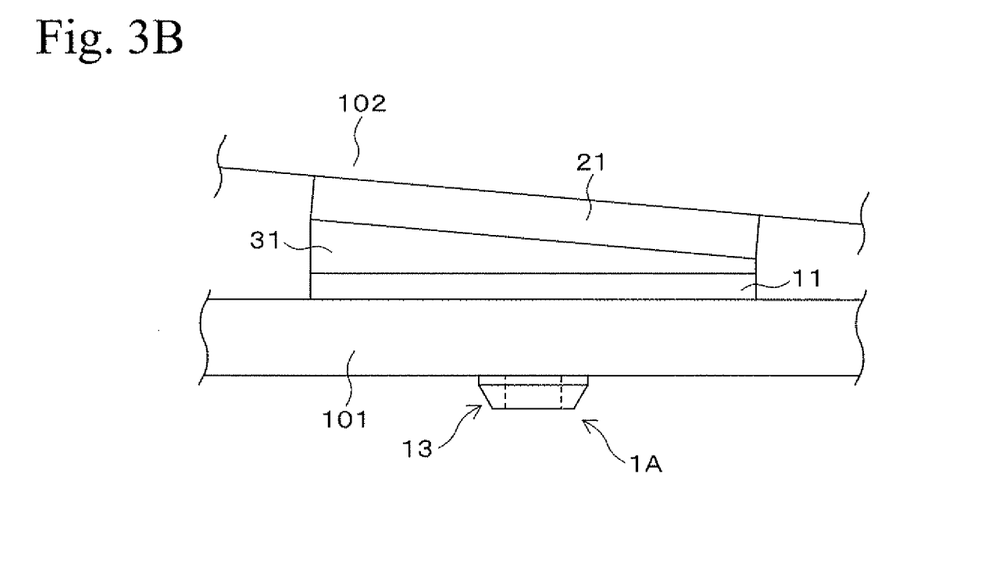
FIG. 3B is a side view which shows a condition in which the modification example of the silencer is disposed between leaf springs of a leaf spring assembly

For example, in a silencer 1A shown in FIG. 3A, a partial contact prevention layer 31 is provided between the fixing layer 11 and the sliding layer 21. The partial contact prevention layer 31 has a compressive elastic modulus higher than the fixing layer 11 and the sliding layer 21. For example, as shown in FIG. 3B, when the interval between the leaf springs 101 and 102 of the leaf spring assembly 100 is larger toward the longitudinal direction outside of the leaf spring assembly 100, since the partial contact prevention layer 31 can be elastically deformed depending on pressing force from the sliding side leaf spring 102, the overall sliding layer 21 can contact the sliding side leaf spring 102. As a result, partial contact can be prevented.

Figure 4A:
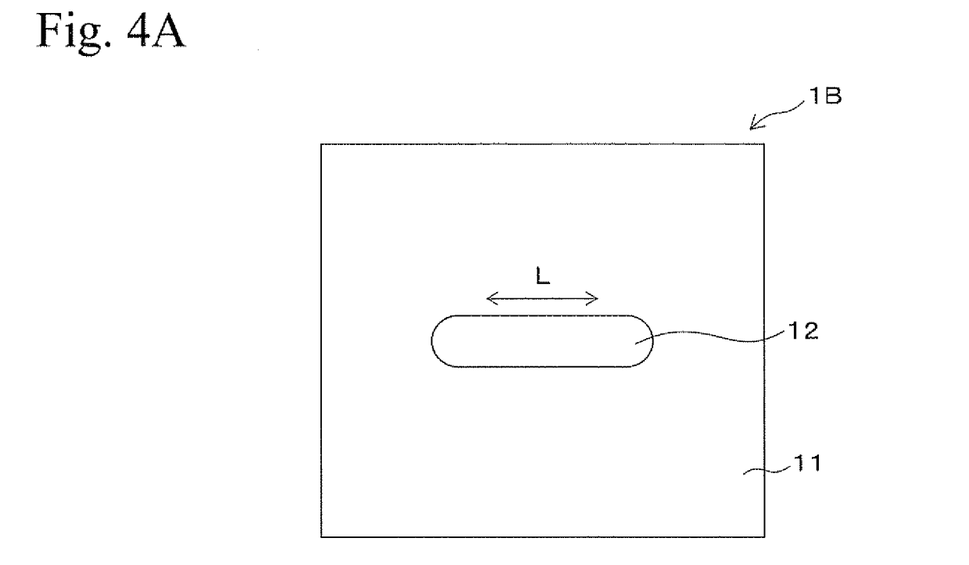
FIG. 4A is a plane view of the another modification example of the silencer.
Figure 4B:
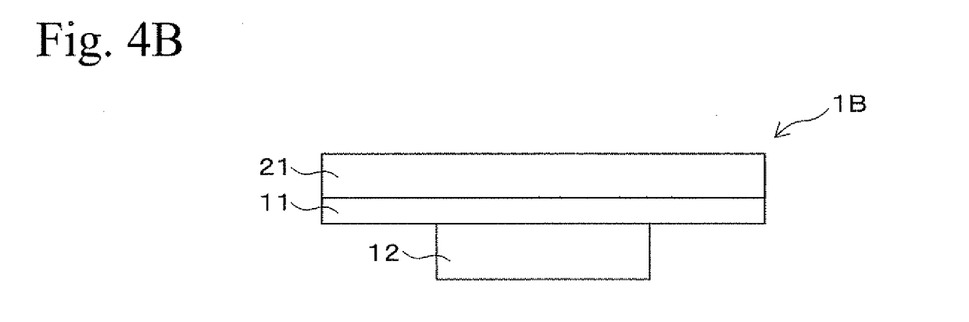
FIG. 4B is a side view of the another modification example of the silencer.

The cross-sectional shape of the multilayer structure is not limited to a circular shape, and various modifications can be made. For example, in a silencer 1B shown in FIGS. 4A and 4B, the outline shape thereof is a square shape. In this feature, contact area between the silencer 1B and the sliding side leaf spring 102 can be greater, so that surface pressure on the sliding side leaf spring 102 can be lower. As a result, wear, which may be caused by sliding on the leaf spring, can be inhibited. In the silencer 1B, the outline shape of the projection portion 12 may be a rectangular shape. In this case, it is desirable that the longitudinal direction L of the rectangular shape of the projection portion 12 extend along the longitudinal direction of the leaf spring assembly 100. The corner portion of the projection portion 12 desirably has a curved surface shape. An engagement portion may be formed at the projection portion 12.

Figure 5:
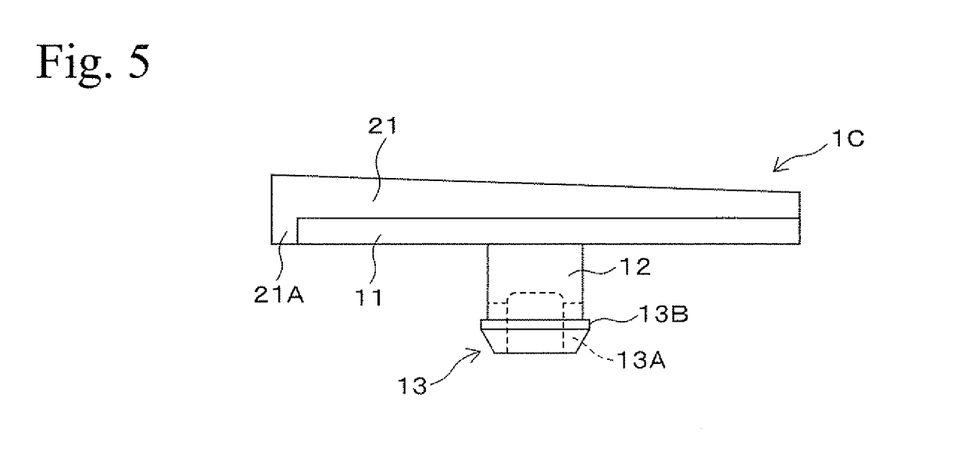
FIG. 5 is a side view which shows another modification example of a silencer for a leaf spring assembly of one embodiment according to the present invention.

In a silencer 1C shown in FIG. 5, the surface of the sliding layer 21 has a tapered shape such that the thickness of the sliding layer 21 is thicker from one end portion to another end portion. For example, when the interval between the leaf springs 101 and 102 of the leaf spring assembly 100 is larger toward the longitudinal direction outside of the leaf spring assembly 100, the thicker side portion of the sliding layer 21 is positioned at the longitudinal direction outside of the leaf spring assembly 100, so that partial contact can be prevented.

In this case, an end portion 21A of the thicker side portion of the sliding layer 21, which is proximate to the fixing layer 11, may be made flush with the surface of the fixing layer 11. The fixing layer 11 and the sliding layer 21 are different from each other in color, so that the end portion 21A functions as a positioning portion indicating the thicker side portion of the sliding layer 21. Regarding methods indicating the thicker side portion of the sliding layer 21, the formed positions of the notch portions 13A of the engagement portion 13 of the projection portion 12 may be appropriately set, and can be used as positioning portions.

The invention claimed is:

1. A silencer for a leaf spring assembly, the silencer being configured for disposal between adjacent leaf springs at an end portion of the leaf spring assembly, the silencer comprising:
a multilayer structure in which layers proximate to each other are integrally injection molded and each layer is comprised of a resin or an elastomer; and
a projection portion which is formed at one outermost layer of the multilayer structure and configured to closely fit into a hole formed in one of the leaf springs,
wherein the one outermost layer has a tensile strength higher than another outermost layer of the multilayer structure,
the another outermost layer has a hardness lower than the one outermost layer, and
the projection portion has an engaging portion that projects from the hole of the leaf spring and engages with a surface of the leaf spring, wherein
the projection portion has a cylindrical portion having a uniform inner diameter at an end portion of the projection portion, the cylindrical portion including a columnar hole at a front end surface of the projection portion, and the cylindrical portion has plural slits opening from an outer peripheral surface to an inner peripheral surface of the cylindrical portion and extending toward an axial direction, and
the cylindrical portion has a tapered front end portion with a diameter that decreases toward a front end side of the cylindrical portion, and has a base end portion in which the engaging portion is formed, the engaging portion having a contacting surface substantially perpendicular to an axis of the cylindrical portion and contacting the leaf spring.

2. The silencer for a leaf spring assembly according to claim 1, wherein a layer, which has a compressive elastic modulus higher than the outermost layers, is provided between the outermost layers.

3. The silencer for a leaf spring assembly according to claim 1, wherein the one outermost layer is more wear-resistant than the another outermost layer.

4. The silencer for a leaf spring assembly according to claim 1, wherein the multilayer structure has an outline shape which is a square shape.

5. The silencer for a leaf spring assembly according to claim 1, wherein the another outermost layer has a surface which is tapered.

6. The silencer for a leaf spring assembly according to claim 1, wherein the another outermost layer has an end portion extending toward the one outermost layer such that the end portion forms a surface identical to a surface of the one outermost layer, and the another outermost layer is integrally formed with a different color from that of the one outermost layer.

7. The silencer for a leaf spring assembly according to claim 1, wherein the slits are located at positions substantially 180 degrees away from each other around the axis of the cylindrical portion.

8. A leaf spring assembly comprising:
plural leaf springs layer adjacent each other; and
a silencer disposed between the adjacent leaf springs at an end portion of the leaf spring assembly;
wherein an end portion of one of the leaf springs has a hole, the silencer comprising:
a multilayer structure in which layers proximate to each other are integrally injection modled and each layer is comprised of a resin or an elastomer; and a projection portion that is formed at one outermost layer of the multilayer structure and closely fitted into the hole formed in the leaf spring, wherein the one outermost layer has a tensile strength higher than another outermost layer of the multilayer structure, wherein the another outermost layer has a hardness lower than the one outermost layer, and wherein the projection portion has an engaging portion that projects from the hole of the leaf spring and engages with a surface of the leaf spring, wherein the projection portion has a cylindrical portion having a uniform inner diameter at an end side of the projection portion, the cylindrical portion including a columnar hole at a front end surface of the projection portion, and the cylindrical portion has plural slits opening from an outer peripheral surface to an inner peripheral surface of the cylindrical portion and extending toward an axial direction, and the cylindrical portion has a tapered front end portion with a diameter that decreases toward a front end side of the cylindrical portion, and has a base end portion in which the engaging portion is formed, the engaging portion having a contacting surface substantially perpendicular to an axis of the cylindrical portion and contacting the leaf spring.

9. The leaf spring assembly according to claim 8, wherein the slits are located at positions substantially 180 degrees away from each other around the axis of the cylindrical portion.

* * * * *